United States Patent [19]

Kennedy

[11] Patent Number: 4,944,490

[45] Date of Patent: Jul. 31, 1990

[54] SHAFTLESS BUTTERFLY VALVE

[76] Inventor: Paul G. Kennedy, 4174 Ridge Rd., Horseheads, N.Y. 14845

[21] Appl. No.: 268,298

[22] Filed: Nov. 7, 1988

[51] Int. Cl.$^5$ .............................................. F16K 5/06
[52] U.S. Cl. ...................................... 251/306; 251/305
[58] Field of Search ............... 251/160, 192, 305, 306, 251/307

[56] References Cited

U.S. PATENT DOCUMENTS

| | | |
|---|---|---|
| 289,107 | 11/1883 | Johnson . |
| 1,603,455 | 10/1926 | Dow . |
| 2,772,850 | 12/1956 | Eaton . |
| 2,815,924 | 12/1957 | Burch . |
| 2,923,523 | 2/1960 | Taylor . |
| 3,043,557 | 7/1962 | Stillwagon . |
| 3,074,421 | 1/1963 | Borcherdt ........................ 251/305 X |
| 3,232,310 | 2/1966 | Treder . |
| 3,273,854 | 10/1966 | Bryant . |
| 3,539,150 | 11/1970 | Conrad . |
| 3,658,293 | 4/1972 | Gaebel . |
| 3,727,879 | 4/1973 | Lange et al. .................... 251/306 X |
| 3,771,759 | 11/1973 | Pabquette . |
| 4,520,995 | 6/1985 | Lew ................................. 251/188 X |

Primary Examiner—John C. Fox
Attorney, Agent, or Firm—Ralph R. Barnard

[57] ABSTRACT

The present invention is a shaftless butterfly valve that does not require a valve housing and may be mounted to a length of pipe by merely drilling a hole into the wall of the pipe. A stuffing box is attached to a pipe by a U-bolt or other conventional means. The stuffing box serves as a drill jig to center the hole that must be drilled in the pipe. A threaded rotatable stem is arranged to penetrate one side of a pipe perpendicularly to the axis thereof. In the interior of the pipe, the stem is threaded into a stem nut which travels along the length of the stem as the stem rotates. Its travel is limited by a stop pin which is located at the extremity of the stem in the interior of the pipe. An elliptical disc is attached to the stem nut by a hinge pin. The valve is closed and opened by rotating the stem nut along the threaded rotatable stem, which in turn forces the disc to pivot about the stem nut and also about the center of the pipe.

6 Claims, 4 Drawing Sheets

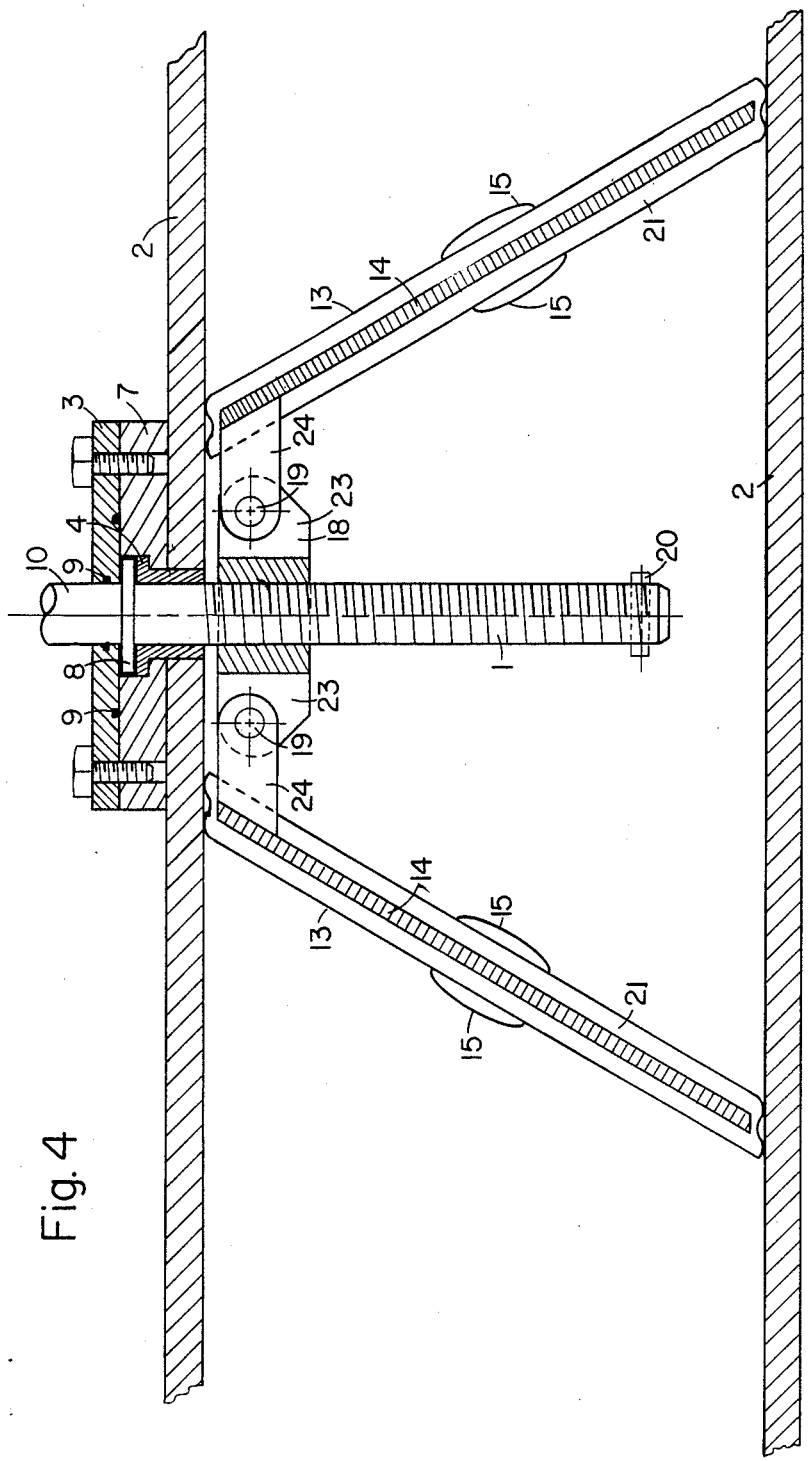

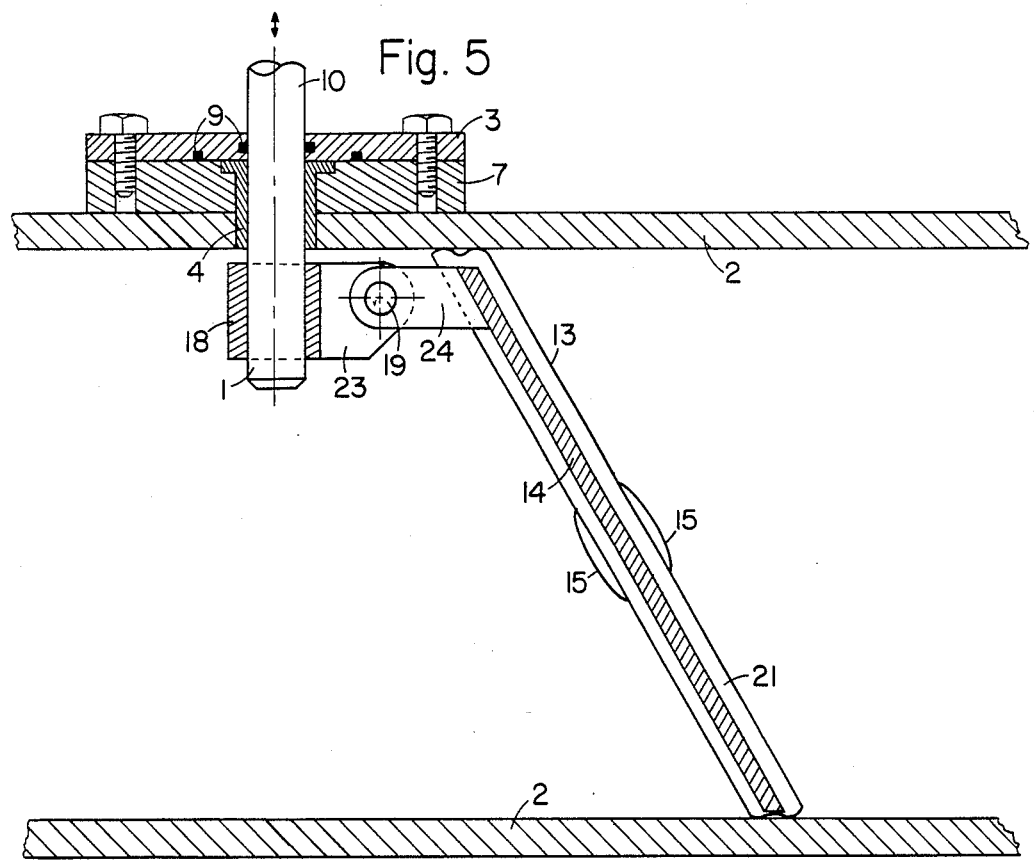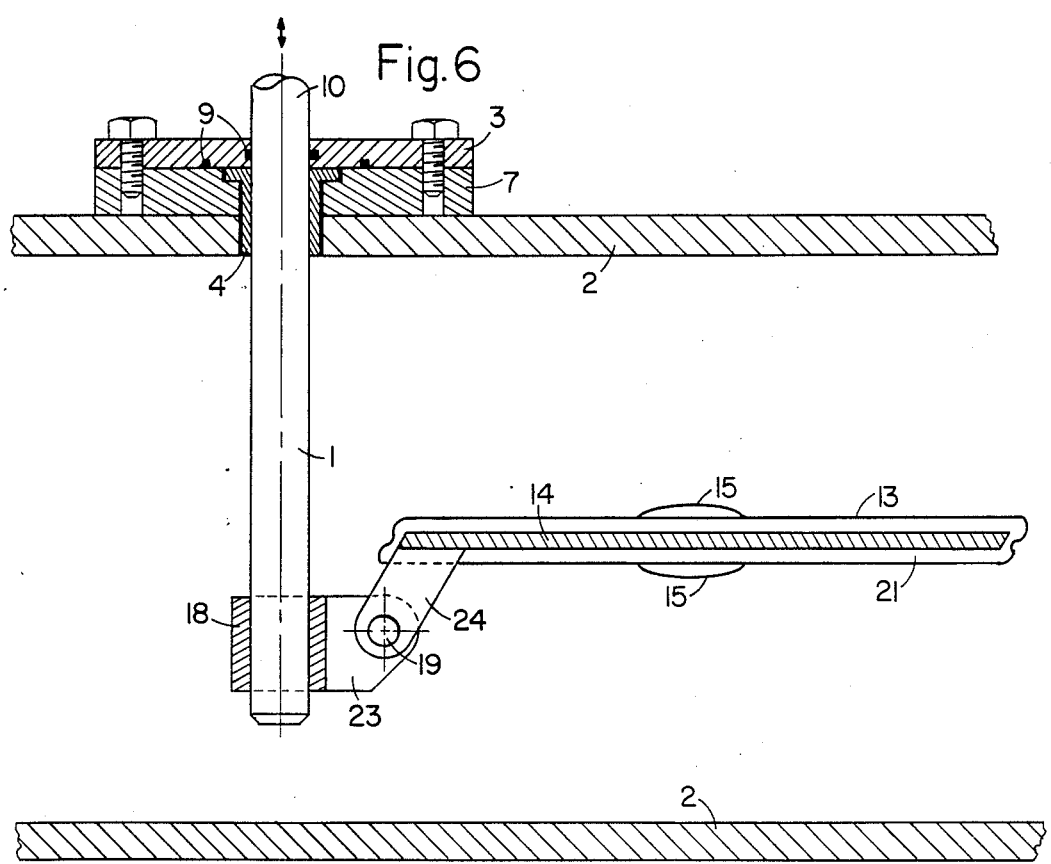

SHAFTLESS BUTTERFLY VALVE

BACKGROUND OF THE INVENTION

1. Field of the Invention

The present invention relates to a shaftless butterfly valve apparatus of the type mounted along a pipe which carries fluids, slurries, gases, or other flowing materials and substances.

2. Description of the Prior Art

A conventional butterfly valve typically includes a circular disc member which is pivotally mounted inside a cylindrical bore defining a flow passage. The disc is mounted to turn on an axis extending transversely of the flow passage between an open position where its plane is generally coincident with the direction of flow and a closed position where its plane is at a right angle to the direction of flow. In a closed position a fluid seal is provided either by the outer periphery of the disc engaging a sealing member provided in the interior of the valve housing or by a sealing member carried on the periphery of the disc engaging a seating surface on the interior of the housing.

Conventional butterfly valves have many disadvantages. One disadvantage is that butterfly valves mounted on pivot shafts, as described above, are relatively expensive to manufacture. One major cost item is the necessity of present state of the art butterfly valves to utilize complex castings or heavy flame cut segments for valve housings due to the need to provide external rotary bearing support for the pivot shaft.

Another disadvantage common to conventional butterfly valves is that they are often difficult to operate because of the binding between the rubber seal and valve seat. This often prevents proper seating of the valve, resulting in undue leakage between the valve and seat. Moreover, the rubber seal often deteriorates over time due to excess binding, particularly at high temperatures.

Furthermore, the typical prior art valve has an actuator which would typically be a gear box or scotch-yoke mechanism with a lever or crank attached. This arrangement increases the size of those portions of the valve mechanism positioned externally of the pipe or valve housing and for many applications this is a further disadvantage.

SUMMARY OF THE INVENTION

The present invention is a shaftless butterfly valve that does not require a valve housing and may be mounted to a length of pipe by merely drilling a hole into the wall of the pipe. It avoids many of the prior art disadvantages described above.

It is an object of the present invention to provide a butterfly valve which is inexpensive to manufacture since it requires few raw materials, has a relatively small number of parts, and does not require a valve housing. Tooling up for production requires a minimal capital expenditure.

It is an another object of the present invention to provide a butterfly valve which is relatively easy to ship and install because it is lightweight and has few parts.

It is still another object of the present invention to provide a butterfly valve which is self-adjusting so that the seal between the disc and the walls of the pipe is always tight notwithstanding any deterioration of the disc.

It is yet another object of the present invention to provide a butterfly valve which has a built-in mechanical advantage, thus keeping the valve close to the pipe and permitting it to fit in tight places.

It is a further object of the present invention to provide a butterfly valve which may be installed in an existing piping system without alterations to the pipe. Alternatively, it may be preinstalled in the pipe, unlike conventional butterfly valves which must be field mounted.

It is another object of the present invention to provide a butterfly valve which is smaller in cross section in the open position than a conventional butterfly valve.

It is still another object of the present invention to provide a butterfly valve which is easily applied to dead end service.

BRIEF DESCRIPTION OF THE DRAWINGS

FIG. 4 is a cross-sectional representation of an alternative embodiment of the inventive valve which functions as a bi-directional valve.

FIG. 5 is a cross-sectional representation of the valve shown in FIG. 2 using an alternative stem which is pushed and pulled to move the valve from an open to a closed position.

FIG. 6 is a cross-sectional representation of the valve shown in FIG. 3 using the alternative stem also illustrated in FIG. 5.

DESCRIPTION OF THE PREFERRED EMBODIMENT

Figure 1:
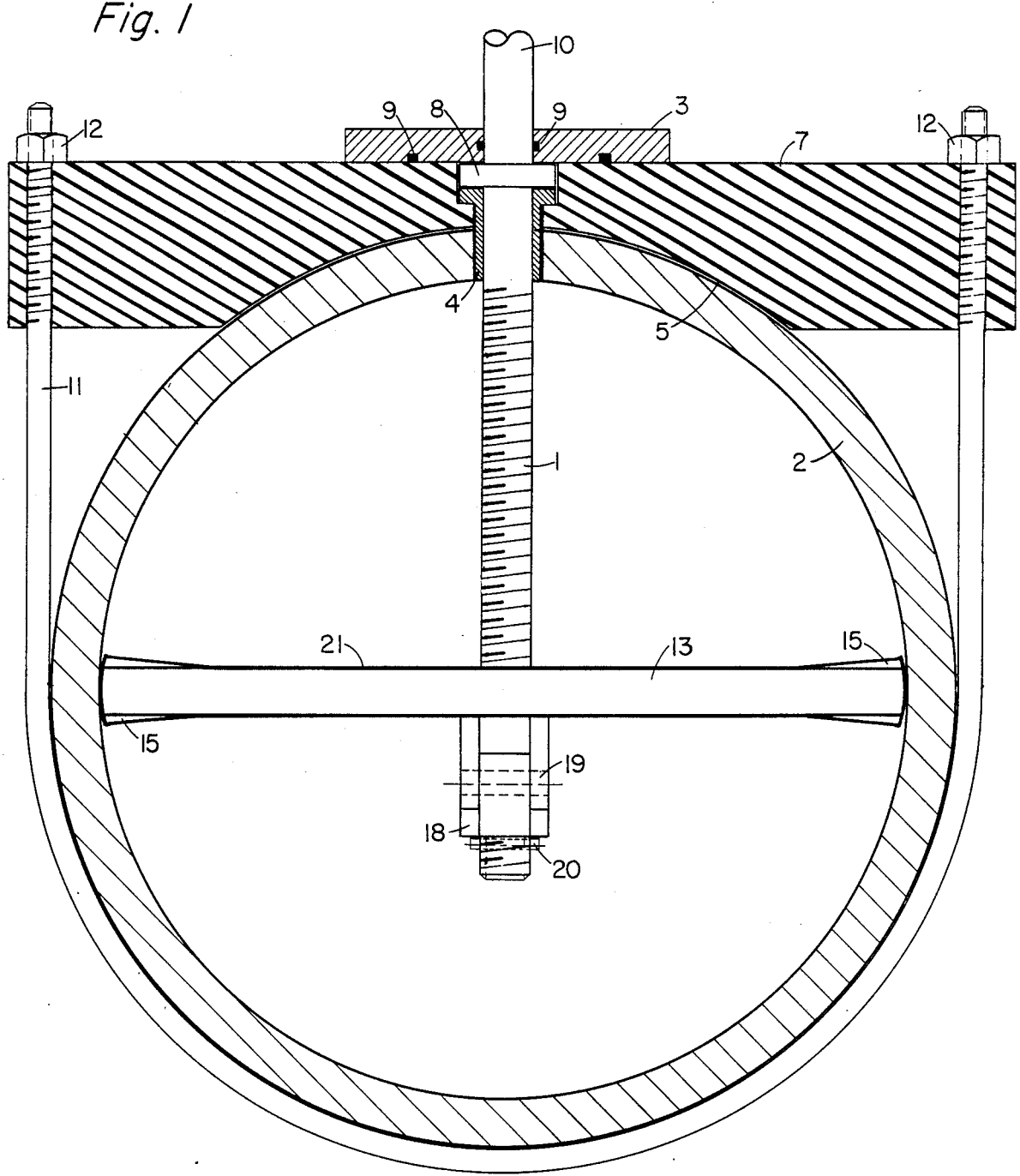
FIG. 1 is an end view with the valve in an open position.

As illustrated in FIG. the inventive butterfly valve includes a threaded rotatable stem (1) which is arranged to penetrate one side of a pipe (2) perpendicularly to the axis thereof. A stuffing box (3) is attached to the pipe (2) by a U-bolt (11) and U-bolt nuts (12). A stuffing box bushing (4) is pressed into the side of the pipe and into the arcuate saddle (7). As shown, the bushing (4) protrudes through the hole drilled in the pipe (2). It serves as a bearing and guide for the stem (1) under operation of the valve.

Saddle seal (5) and 0-ring seals (9) are used to prevent leakage. Thrust washer (8) reduces the friction between the collar (6), saddle (7) and stuffing box (3).

The stem (1) may be rotated by any conventional means. A handle may be attached to the part of the stem (1) that protrudes through the stuffing box (3), generally designated at (10).

The stem (1) is threaded into a stem hinge nut (18) which travels along the length of the stem (1) as the stem rotates. Its travel is limited by a stop pin (20) which is located at the extremity of the stem (1) in the interior of the pipe (2).

An elliptical disc (13) having a larger major and a smaller minor axis which includes an insert (14) having a hinge joint protrusion (24), rubber coating (21), and excess rubber edges (15) in the vicinity of the minor axis is attached to the stem hinge nut (18) having a hinge joint protrusion (23) by a hinge pin (19). The excess rubber edges (15) are added at the wear points of the disc (13) at a minor axis where the most rubbing and sliding takes place.

The preferred method of placing the valve in an existing pipe system is to place the saddle (7) onto the pipe (2) and to secure it with a U-bolt (11) and U-bolt nuts (12). Alternatively, the saddle could be attached to or molded into the pipe (2), thus eliminating the need for the U-bolt (11). Either way, the stuffing box (3) serves as a drill jig to center the hole that must be drilled in the pipe (2).

The stuffing box bushing (4) is pressed into the saddle (7) and the pipe (2). It serves to guide the stem (1) under operation of the valve. The stem hinge nut (18) is pinned to the disc (13) by attaching the first hinge joint protrusion (23) of the stem hinge nut (18) to the second hinge joint protrusion (24) of the insert (14) of the disc (13) with hinge pin (19). The disc (13) is slid into the pipe (2) in the appropriate position. The stem (1) is pushed through the stuffing box (3) and threaded into the stem hinge nut (18), after which time the stop pin (20) is driven into the end of the stem (1). The additional parts described above may then be added to the exterior of the pipe (2).

The present invention is more readily applicable to dead end service than conventional butterfly valves because it is drilled right through the pipe and does not require housing. Whereas conventional butterfly valves require a piece of pipe to be attached to each side of the valve housing to hold the valve in place and to keep it from blowing off the end of the pipe.

Figure 2:
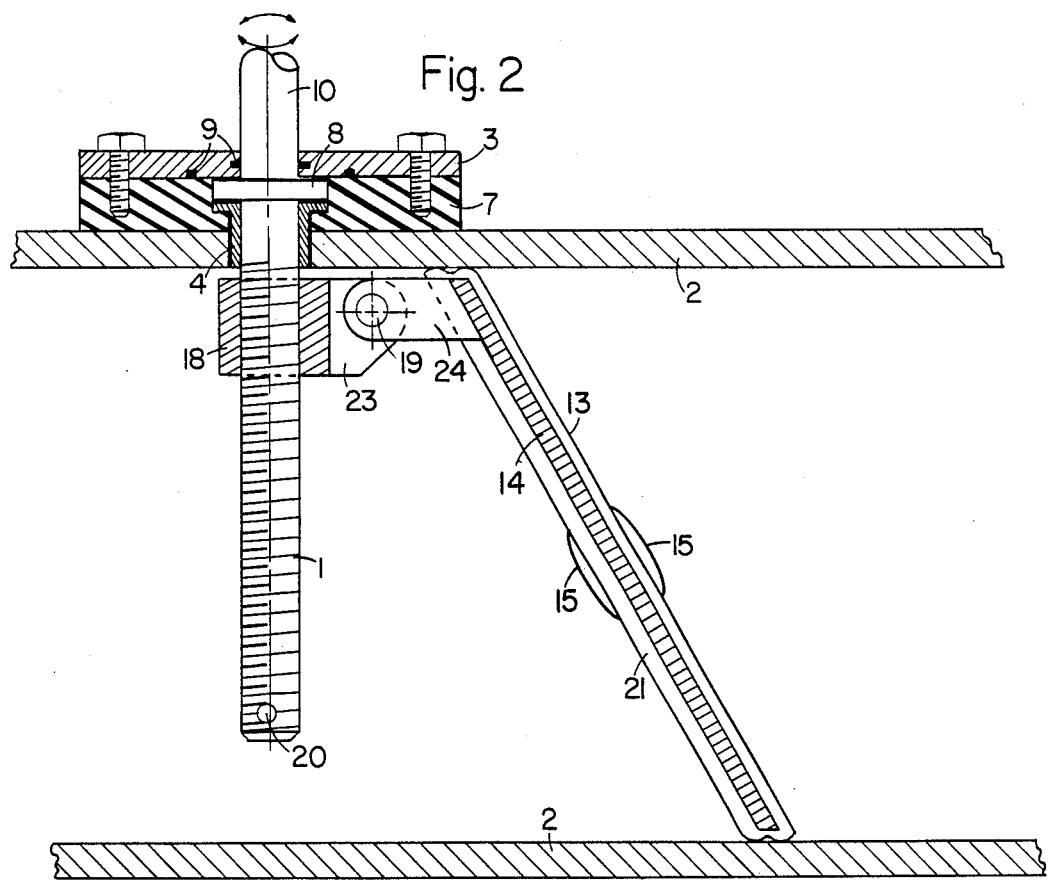
FIG. 2 is a cross-sectional representation of the valve in a closed position.

The operation of the present invention is now described with reference to FIGS. 2 and 3. As shown in FIG. 2, the disc (13) is held in the closed position by the stem hinge nut (18) which has been moved along by the stem (1) to its farthest position away from the stop (20) pin and adjacent to the wall of the pipe (2) nearest to the source of rotation. When the stem hinge nut (18) moves toward this position, the disc (13) pivots about pin (19) wedging itself within pipe (2). The valve functions almost like a check valve as pressure forces the disc (13) to pivot and wedging occurs. As a consequence, an upward thrust on the stem hinge nut (18) occurs causing the valve to close more easily with pressure against the disc (13).

The disc (13) is elliptical in shape with a major and a minor axis. For example, when it assumes an angular position with the center line of the pipe, such as to close the same, it appears round in shape when looking down the pipe (view not shown). The elliptical shape may be larger in size than the inside diameter of the pipe (2) along the minor axis or as well as the major axis such that there is the interference between the disc (13) at the location of rubber edge (15) and pipe (2). Rubber edges (15) may be made of the same material as rubber coating (21). If rubber edges (15) ar not used it would appear that the rubber coating (21) will wear out more quickly. The disc (13) is able to effect a seal upon the walls of the pipe (2) because of the resilient nature of rubber coating (21). Pressure in the pipe (2) also aids in effecting a better seal, because it further wedges the disc (13) down into the pipe (2).

The elliptical shape of the disc (13) allows the valve to be self-adjusting. As the rubber coating on the disc (13) wears down, the valve will adjust itself by wedging farther into the pipe when closed. Thus, unlike a standard butterfly valve which will leak when the interference wears down, the inventive butterfly valve will maintain an effective seal.

Figure 3:
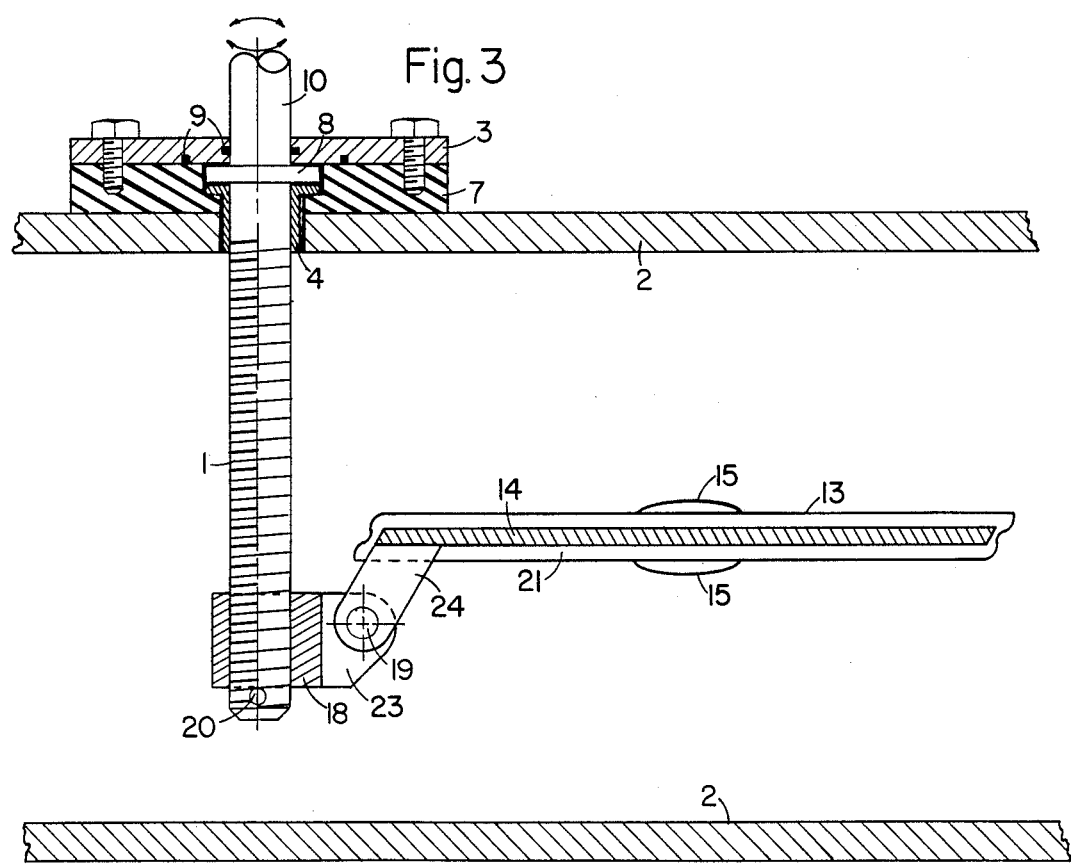
FIG. 3 is a cross-sectional representation of the valve in an open position.

As shown in FIG. 3, the valve opens when the stem (1) is turned counterclockwise forcing the stem hinge nut (18) to travel toward the stop pin (20). The disc (13) pivots about the stem hinge nut (18) and also about the center of the pipe (2). As the inventive valve rotates about the center of the pipeline, it pivots and slides forward. The pivoting occurs because the end of the disc (13) attached to the stem hinge nut (18) is driven to the center of the pipe (2) where its minor axis continues to fit.

The disc (13) is nearly level when the stem hinge nut (18) abuts against the stop pin (20). The slight pitch of the disc (13) insures that it will not flutter under flowing conditions. It is biased in the downward direction as a result of dynamic loads. Because the disc (13) is shaftless, it has a small cross-section which is advantageous because pressure losses are minimal.

When forces exerted by the disc (13) are greatest, due to a pressure differential across the disc (13), the stem hinge nut (18) is in the up position which lessens bending stresses on the stem (1) and limits stresses to shear only. Therefore, the stem (1) may be minimized in size. When the stem hinge nut (18) is down, enhancing bending of the stem (1) by a larger moment arm, the forces of the disc are due to flow only are minimal in ordinary conditions.

The embodiment described above is a one directional valve. As illustrated in FIG. 4, as an alternative embodiment, the inventive valve may be made bi-directional with the attachment of a second disc (22) to the stem hinge nut (18) in mirror image to the first disc (13).

FIGS. 5 and 6 illustrate another means of opening and closing the valve. Neither the stem (25) nor the stem head (26) are threaded. The hinge joint protrusion (24) of disc (13) is pinned by hinge pin (19) to the hinge joint protrusion (23) of stem head (26). Stem head (23) is fixedly attached to the extremity of stem (25) located inside the conduit (2). The valve is closed, as shown in FIG. 5, when the protruding part of the stem (generally designated at 10) is pulled in an upward direction until the stem head (26) is adjacent to the wall of the pipe (2) nearest to the source of force. The valve is opened, as shown in FIG. 6, when the protruding part of the stem (generally designated at 10) is pushed in a downward direction until the stem head (26) has forced the disc (13) to a nearly level position.

Although I have herein shown and described only a few embodiments of my invention, it will be apparent to those skilled in the art to which the invention appertains, that various other changes and modifications may be made to the subject invention without departing from the spirit and scope thereof, and therefore it is to be understood that all modifications, variations, and equivalents within the spirit and scope of the subject invention are herein meant to be encompassed in the appended claims.

I claim:

1. A butterfly valve in a round pipe-like conduit comprising:
   round pipe-like conduit means;
   plate means for closing and opening said round pipe-like conduit means;
   said plate means being elliptical with a major and a minor axis;
   rotatable stem means penetrating one side of said pipe-like conduit means along an axis perpendicular to said round pipe-like conduit means at its center;
   said rotatable stem means containing threads as it passes within said pipe;

a threaded stem hinge nut means fitted with a first hinge joint protrusion in a direction closest to said plate means, and placed around said rotatable stem means movable in either direction along said stem means;

a second hinge joint protrusion means fixedly connected to said plate means at a location coinciding with its major axis and closest to said stem means;

a hinge pin means joining said first and second hinge joint protrusion means together such that the rotation of said stem means will move said plate means to close and open said round pipe-like conduit means as determined by the direction of said stem rotation;

said plate means being reversibly rotatable about an axis perpendicular to the axis of said pipe conduit means and also perpendicular to the rotatable stem means and at the same time said plate means reversibly translates a related distance along said axis of said pipe conduit means;

said minor axis of said plate means being slightly larger than the diameter of said pipe conduit means and the incremental length of the major axis of the elliptical plate means being directly related in magnitude to the translation distance of said elliptical plate during the rotation thereof from full open to full close and vice versa with the direction of translation being in one direction for opening and the other direction for closing.

2. The butterfly valve in a round pipe-like conduit of claim 1, wherein said plate means has added material at points adjacent to the minor axis of its rotation.

3. The butterfly valve in a round pipe-like conduit of claim 1, wherein:

said plate means is made of a rigid structural material encapsulated in a material which will from a seal by deforming to fill any openings between said plate means and the inner surface of said round pipe-like conduit.

4. The butterfly valve in a round pipe-like conduit of claim 3, wherein said plate means is made of metal and is encapsulated in elastomer material.

5. A butterfly valve in a round pipe-like conduit, comprising:

a. a round pipe-like conduit;
an elliptical plate means;
stem means reversibly rotating said plate means on an axis perpendicular to said pipe and also perpendicular to said stem means and at the same time translating the plate in the same direction as the flow in the round pipe to be sealed.

6. A butterfly valve in a round pipe-like conduit comprising:

round pipe-like conduit means;

plate means for closing and opening said round pipe-like conduit means;

said plate means being elliptical with a major and a minor axis;

stem means penetrating one side of said pipe-like conduit means along an axis perpendicular to said round pipe-like conduit means at its center;

stem head means fitted with a first hinge joint protrusion in a direction closest to said plate means, and placed around said stem means;

a second hinge joint protrusion means fixedly connected to said plate means at a location coinciding with its major axis and closest to the stem means;

a hinge pin means joining said first and second hinge joint protrusion means together such that the movement of said stem hinge nut means will move said plate means to close and open said round pipe-like conduit means as determined by the direction of movement of said stem;

said plate means being reversibly rotatable about an axis perpendicular to the axis of said pipe conduit means and also perpendicular to the stem means and at the same time the said plate means reversibly translates a related distance along said axis of said pipe conduit means;

said minor axis of said plate means being slightly larger than the diameter of said pipe conduit means and the incremental length of the major axis of the elliptical plate means being directly related in magnitude to the translation distance of said elliptical plate during the rotation thereof from full open to full close and vice versa with the direction of translation being in one direction for opening and the other direction for closing.

* * * * *